(12) United States Patent
Hayashi et al.

(10) Patent No.: US 7,249,608 B2
(45) Date of Patent: Jul. 31, 2007

(54) FLOW CONTROL FOR POWER STEERING

(75) Inventors: Tetsuji Hayashi, Tokyo (JP); Tsunefumi Arita, Tokyo (JP); Hideyasu Ihira, Tokyo (JP)

(73) Assignee: Kayaba Industry Co., Ltd, Tokyo (JP)

( * ) Notice: Subject to any disclaimer, the term of this patent is extended or adjusted under 35 U.S.C. 154(b) by 219 days.

(21) Appl. No.: 10/959,325

(22) Filed: Oct. 7, 2004

(65) Prior Publication Data
US 2005/0077099 A1    Apr. 14, 2005

(30) Foreign Application Priority Data
Oct. 10, 2003   (JP) .............................. 2003-352276

(51) Int. Cl.
*B62D 5/08*    (2006.01)
(52) U.S. Cl. .................. 137/115.03; 91/437; 180/422; 180/441; 180/442
(58) Field of Classification Search ........... 137/115.03, 137/115.05, 115.07, 115.1; 91/437; 180/422, 180/441, 442
See application file for complete search history.

(56) References Cited

U.S. PATENT DOCUMENTS

| 4,361,166 A | * | 11/1982 | Honaga et al. | ........ 137/115.07 |
| 4,691,797 A | * | 9/1987 | Miller | ........ 180/423 |
| 5,192,196 A | * | 3/1993 | Gettel | ........ 417/300 |
| 5,832,949 A | * | 11/1998 | Hayashi et al. | ........ 137/115.05 |
| 6,058,962 A | * | 5/2000 | Hayashi et al. | ........ 137/115.05 |
| 6,148,947 A | * | 11/2000 | Eberhart et al. | ........ 180/441 |
| 6,871,661 B2 | * | 3/2005 | Staton et al. | ........ 137/1 |
| 2001/0004953 A1 | * | 6/2001 | Takai et al. | ........ 180/423 |

FOREIGN PATENT DOCUMENTS

| JP | 10-230860 | 9/1998 |
| WO | WO 03/023227 | 3/2003 |

* cited by examiner

*Primary Examiner*—Ramesh Krishnamurthy
(74) *Attorney, Agent, or Firm*—Rabin & Berdo, PC

(57) ABSTRACT

The flow control device comprises a supply passage (2) for supplying hydraulic fluid discharged by a pump (1) to a power steering output section (8); a variable throttle section (3) situated at an intermediate position of the supply passage (2); and a flow control valve (4) for returning the hydraulic fluid in the supply passage (2) to the pump inlet side, in accordance with a pressure differential between upstream and downstream of the variable throttle section (3). When the pump (1) is halted, the flow control valve (4) is impelled by a spring (13) and closes the variable throttle section (3). A throttle passage (51) is provided for connecting the upstream side and the downstream side of the variable throttle section with the supply passage (2).

2 Claims, 3 Drawing Sheets

FLOW CONTROL FOR POWER STEERING

TECHNICAL FIELD

This invention relates to flow control of hydraulic fluid supplied to a power steering system which assists the steering force of vehicle wheels by means of fluid pressure.

BACKGROUND ART

In the prior art, a flow control device for a power steering system of this kind is disclosed in PCTWO 03/023227A1 and JP 10-230860A.

SUMMARY OF THE INVENTION

However, in a conventional flow control valve of this kind, if the supply of hydraulic fluid from the pump is halted due to the vehicle halting, then the flow control valve closes completely and the hydraulic fluid ceases to flow to the power steering actuator at all.

If the spool of the flow control valve becomes fixed in this state due to the phenomenon of sticking, then even if the pump is operated by starting up the engine, absolutely no hydraulic fluid will be supplied to the power steering actuator, and hence not only will no steering assisting force be obtained, but also the operational load on the pump will become excessive.

It is an object of this invention to provide a flow control device for power steering having a fail safe function capable of supplying hydraulic fluid even if sticking of the flow control valve occurs.

In order to achieve the aforementioned object, the flow control device for power steering according to this invention comprises: a supply passage for supplying hydraulic oil discharged from a pump to a power steering section; a variable throttle section disposed in the supply passage; a return passage branching from the supply passage at a position upstream of the variable throttle section and connected to the inlet side of the pump; a flow control valve displaced in accordance with a pressure differential between upstream and downstream sides of the variable throttle section and connecting the return passage selectively to the supply passage; a spring for impelling the flow control valve in a direction to close the variable throttle section and the return passage; and a throttle passage for connecting the upstream side and the downstream side of the supply passage by circumventing the variable throttle section; the upstream side and the downstream side of the variable throttle section being maintained in a connected state by means of the throttle passage, when the flow control valve has closed both the variable throttle section and the return port by being impelled by the spring during shutdown of the pump.

PREFERRED EMBODIMENT OF THE INVENTION

Below, embodiments of a flow control device according to this invention are described with reference to the drawings.

Figure 1:
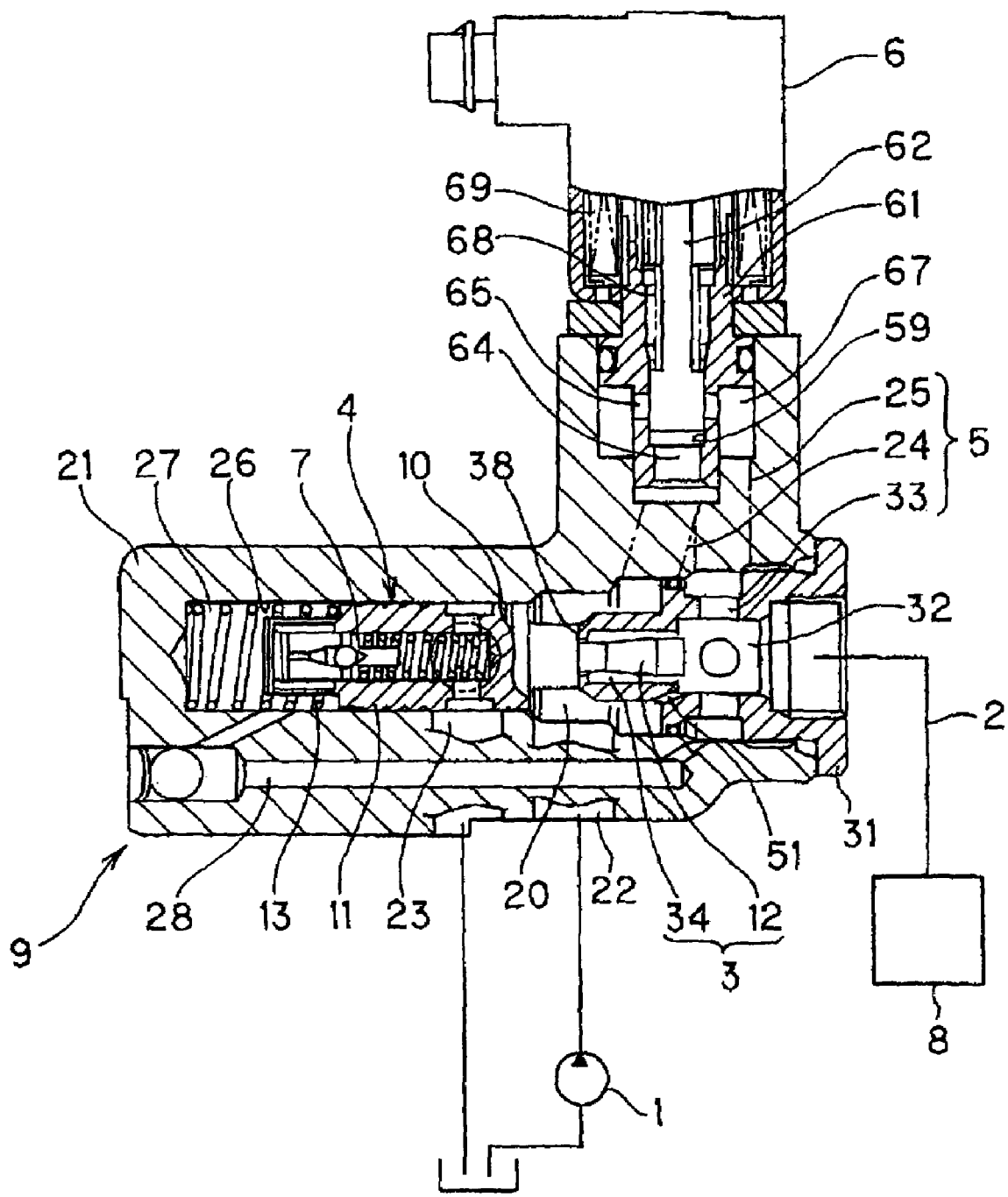
FIG. 1 is a cross-sectional view of a fluid control device showing a first embodiment of this invention.

FIG. 1 shows a first embodiment, and in this drawing, numeral 1 denotes a pump, and numeral 8 denotes a power steering output section for steering vehicle wheels, the power steering section 8 being operated by hydraulic fluid supplied from the pump 1 and thereby generating a steering assist force. Although not shown in the drawings, the power steering section 8 comprises a switching valve which switches in accordance with the operation of the steering wheel of the vehicle, and a steering actuator. The direction in which the hydraulic oil is supplied is changed by the switching of the switching valve, and the steering actuator is operated accordingly and causes the vehicle wheels to turn.

A flow control device 9 is provided in order to control the amount of hydraulic fluid supplied to the power steering section 8 from the pump 1, in accordance with the operating conditions of the vehicle.

If the rotational speed of the pump 1 driven by the vehicle engine is low, then the flow control device 9 supplies the full amount of the pump discharge to the power steering section 8, if the rotational speed of the pump is in a medium range, then the flow control device 9 supplies a prescribed amount of flow, and if the rotational speed of the pump is in a high range, then it reduces the supplied flow beyond the aforementioned prescribed amount of flow.

For this purpose, the flow control device 9 comprises; a variable throttle section 3 which is situated in the supply passage 2 supplying the hydraulic fluid discharged by the pump 1 to the power steering output section 8; a flow control valve 4 for returning the hydraulic fluid in the supply passage 2 to the pump inlet side, in other words, the reservoir, in accordance with the pressure differential between upstream and downstream of the variable throttle section 3; a solenoid valve 6 for opening and closing a bypass passage 5 which circumvents the variable throttle section 3 in the supply passage 2; and a relief valve 7 which allows the hydraulic oil to escape into the reservoir when the pressure on the downstream side of the variable throttle section 3 has risen to a certain value or above.

The flow control device 9 comprises a casing 21 and a cap 31 which engages with this casing 21, and the flow control valve 4 and the variable throttle section 3 are accommodated within this.

For this reason, a spool hole 26 in which a spool 11 of the flow control valve 4 is disposed slidably, a pump port 22 connected to the output side of the pump 1, a return port 23 constituting a return passage connected to the pump inlet side, and bypass ports 24 and 25 constituting a bypass passage 5, are formed in the casing 21. Furthermore, a supply port 34 into which a taper rod 12 of the variable throttle section 3 is inserted, a downstream side chamber 32 forming a part of the supply passage 2, and a bypass port 33 forming a part of the bypass passage 5, are formed in the cap 31.

The flow control valve 4 comprises the spool 11 which slides in the spool hole 26, and this spool 11 is impelled in the right-hand direction in the figure by means of a spring 13. A land section 10 is formed on the outer circumference of an end portion of the spool 11. When the spool 11 moves towards the left in the figure, against the resistance of the spring 13, then the front end of the land section 10 opens the return port 23, thereby connecting the pump port 22 and the return port 23, in such a manner that the flow of the hydraulic fluid returning to the return port 23 from the pump port 22 is adjusted in accordance with the sliding position of the spool 11.

The right end side of the spool 11 adjoins an upstream side chamber 20 which forms the upstream side of the variable throttle section 3, and the left end side of the spool 11 adjoins a spring chamber 27 in which a spring 13 is placed. This spring chamber 27 communicates with the downstream side chamber 32 which is located at the downstream side of the variable throttle section 3, through a connecting hole 28. The pressure differential between upstream and downstream of the variable throttle section 3 is supplied to both ends of the spool 11 in the flow control valve 4, and the spool 11 moves to a position where this pressure differential balances with the spring force of the spring 13.

The relief valve 7 is provided inside the spool 11 and if the steering load on the power steering section 8 has increased and the pressure in the downstream side chamber 32 has risen to a certain value or above, then the relief valve 7 opens, thereby connecting the spring chamber 27 to the return port 23, and the hydraulic oil in the downstream side chamber 32 escapes into the reservoir, thus preventing the downstream supply passage 2 from reaching an abnormally high pressure.

The variable throttle section 3 is formed at an intermediate position of the supply passage 2, and it comprises a supply port 34 connecting the upstream side chamber 20 and the downstream side chamber 32, and a taper rod 12 for changing the effect area of the opening of this supply port 34.

The supply port 34 is formed passing through the end wall 38 of the cap 31, and a taper rod 12 formed on the end section of the spool 11 is inserted into this supply port 34. The taper rod 12 moves in unison with the spool 11, thereby altering the area of the opening of the supply port 34. In this case, the opening area does not change within a prescribed stroke range of the spool 11 from its initial state towards the left-hand side in the figure, but if the spool 11 moves beyond this prescribed stroke range, then the aforementioned area of opening gradually decreases in accordance with this movement.

If the pump 1 has halted, then the right-end face of the spool 11 becomes seated on the end wall 38 of the cap 31, due to the impelling force of the spring 13. In this state, the return port 23 is closed by the land section 10 of the spool 11, and the supply port 34 also closes, thereby shutting off completely the flow of hydraulic oil from the pump port 22 to the upstream side chamber 20.

The solenoid valve 6 located in the bypass passage 5 comprises a circular cylindrical housing 61 installed on the casing 21, and a valve body 62 accommodated slidably in a valve hole 59 provided inside this housing 61. An upstream chamber 64 connecting with the bypass port 24 connected to the aforementioned upstream side chamber 20 is formed on the inner side of the housing 61, and a downstream chamber 67 connecting with the aforementioned downstream side chamber 32 via the bypass port 25 is formed on the outer side of the housing 61. The valve body 62 opens and closes the valve hole 65, which connects the upstream chamber 64 with the downstream chamber 67.

A spring 68 for impelling the valve body 62 in the closing direction is provided, and a coil 69 for driving the valve body 62 in the opening direction against the resistance of the spring 68 is also provided.

The valve body 62 is driven in the opening direction (the upward direction in the figure) against the resistance of the spring 68, by an electromagnetic force generated when current is supplied to the coil 69. In this state, a portion of the hydraulic oil discharged by the pump 1, circumvents the variable throttle section 3 and flows to the power steering section 8.

When no current is supplied to the coil 69, then the valve body 62 is pressed down by the force of the spring 68, thereby causing the valve hole 65 to close and hence shutting off the bypass passage 5. In this state, the hydraulic fluid discharged by the pump 1 does not flow along the bypass passage 5.

In the flow control device 9, since both the variable throttle section 3 and the return port 23 are fully closed by the flow control valve 4, and the solenoid valve 6 is also closed, when the pump 1 is halted, then in cases where sticking has occurred in such a manner that the spool 11 has become fixed to the spool hole 26 of the casing 21 or the end wall 38 of the cap 31, no hydraulic fluid will be supplied to the power steering discharged section 8 at all, even if the pump 1 is began to operate. Consequently, no steering assist force will be obtained, and furthermore there is a possibility that the load on the pump 1 will become excessive.

Even if sticking of the spool 11 has occurred in this manner, in the present embodiment, a throttle passage 51 is provided for connecting the upstream and downstream sides of the variable throttle section 3 to the supply passage 2, in such a manner that hydraulic oil can be supplied to the power steering section 8. The throttle passage 51 is provided in the cap 31 in such a manner that it connects the upstream side chamber 20 with the downstream side chamber 32.

However, the cross-sectional area of the throttle passage 51 is set in such a manner that the flow rate therein never exceeds the flow passing through the variable throttle section 3, during normal operation at the least. This is because if the flow passing through the throttle passage 51 becomes too large, then the sense of controlling the flow by means of the variable throttle section 3 becomes lost. The sum of the flow of hydraulic fluid passing along the throttle passage 51 and the flow of hydraulic fluid passing through the variable throttle section 3 forms the flow required by the power steering output section 8.

Next, the action of this invention will be described.

When the engine is halted, the pump 1 also halts, the spool 11 is seated on the end wall 38 due to the impelling force of the spring 13, and the variable throttle section 3 is fully closed by the flow control valve 4. Moreover, the solenoid valve 6 is also closed by the spring 68.

When the engine is operated, the pump 1 is driven, and hydraulic fluid discharged by the pump 1 flows to the pump port 22 and the upstream side chamber 20, while a portion of this hydraulic fluid flows through the throttle passage 51 to the downstream side chamber 32. Furthermore, the spool 11 moves against the resistance of the spring 13, due to the discharge pressure of the pump 1 supplied to the upstream side chamber 20, and when it detaches from the end face 38, the variable throttle section 3 opens and hydraulic fluid flows from the upstream side chamber 20 along the supply port 34 to the downstream side chamber 32. The respective flows of hydraulic fluid merge in the downstream side chamber 32 and are supplied to the power steering output section 8. The power steering output section 8 assists the steering force of the vehicle wheels by means of this hydraulic fluid.

In a state where the pump 1 is rotating at a low speed, the return port 23 is closed by the flow control valve 4 and the full amount of fluid discharge in direct proportion to the rotational speed of the pump 1 is supplied to the power steering output section 8.

When the rotational speed of the pump 1 reaches a medium speed range, the pressure in the upstream side chamber 20 increases, the flow control valve 4 is pushed and moved by this pressure, and the return port 23 duly opens.

Accordingly, a portion of the hydraulic fluid flowing into the upstream side chamber 20 is recycled to the return port 23.

The spool 11 comes to rest at a position where a pressure differential between the upstream side chamber 20 and the spring chamber 27 balances with the combined force of the spring 13. Since the pressure in the downstream side chamber 32 of the variable throttle section 3 is supplied to the spring chamber 27, as a result, the spool 11 is displaced in accordance with the pressure differential between the upstream and the downstream sides of the variable throttle section 3, and as the pressure differential increases, so the return port 23 opens wider and the amount of hydraulic fluid returning to the return port 23 from the upstream side chamber 20 increases.

In this way, the pressure differential between the upstream and downstream sides of the variable throttle section 3 is maintained at a uniform value. The amount of hydraulic oil passing through the variable throttle section 3 is directly proportional to the area of the opening of the variable throttle section 3 and the pressure differential between the upstream and downstream sides thereof, and if the pressure differential is controlled so as to maintain a uniform value, then consequently, the amount of hydraulic oil passing through the variable throttle section 3 will be directly proportional to the area of the opening. The area of the opening of the variable throttle section 3 is determined by the taper rod 12 which is inserted into the supply port 34. In the range where the amount of movement of the spool 11 is small, the cross-sectional area of the taper rod 12 is uniform, and hence the area of the opening of the variable throttle section 3 is also uniform.

Therefore, when the rotational speed of the pump is in the medium speed range, the amount of hydraulic fluid supplied to the power steering output section 8 via the variable throttle section 3 is maintained at a substantially uniform value.

If the rotational speed of the pump 1 increases, then the discharge of the pump rises, thereby increasing the pressure on the upstream side of the variable throttle section 3 and causing the spool 11 to retract further against the resistance of the spring 13. The taper rod 12 moves together with the spool 11, and therefore the effective area of the opening of the support port 34 in the variable throttle section 3 decreases gradually and the flow of hydraulic fluid supplied to the power steering output section 8 also decreases gradually.

The flow of hydraulic fluid is decreased in this manner because when the engine is operating at a high speed, the speed of travel of the vehicle is also high and resistance to travel becomes lower, which means that the amount of hydraulic fluid required by the power steering section 8 in order to achieve stable steering is reduced.

Furthermore, if the solenoid valve 6 opens, a portion of the hydraulic fluid discharged by the pump 1 flows from the upstream side chamber 20, via the bypass port 24, the solenoid valve 6 and the bypass port 25, to the downstream side chamber 32, separately from the variable throttle section 3 described above.

Therefore, if it is sought to increase the amount of hydraulic fluid supplied to the power steering output section 8, then by opening the solenoid valve 6, an increased flow of fluid to the power steering output section 8 can be achieved and hence the steering assist force can be increased.

On the other hand, since the flow control device 9 is provided with a throttle passage 51 which connects the upstream side and the downstream side of the variable throttle section 3 to the supply passage 2, then even supposing that valve sticking occurs, namely, a phenomenon whereby the spool 11 becomes fixed to the valve body 21 or the cap 31, while the pump 1 is halted, when the pump 1 is operated subsequently, the hydraulic fluid discharged by the pump 1 will still be supplied to the power steering output section 8 via the throttle passage 51. Consequently, the minimum required steering assist force is obtained in the power steering output section 8, and furthermore, a fail safe function can be achieved whereby the load on the pump 1 can be prevented from reaching an excessive level.

Figure 2:
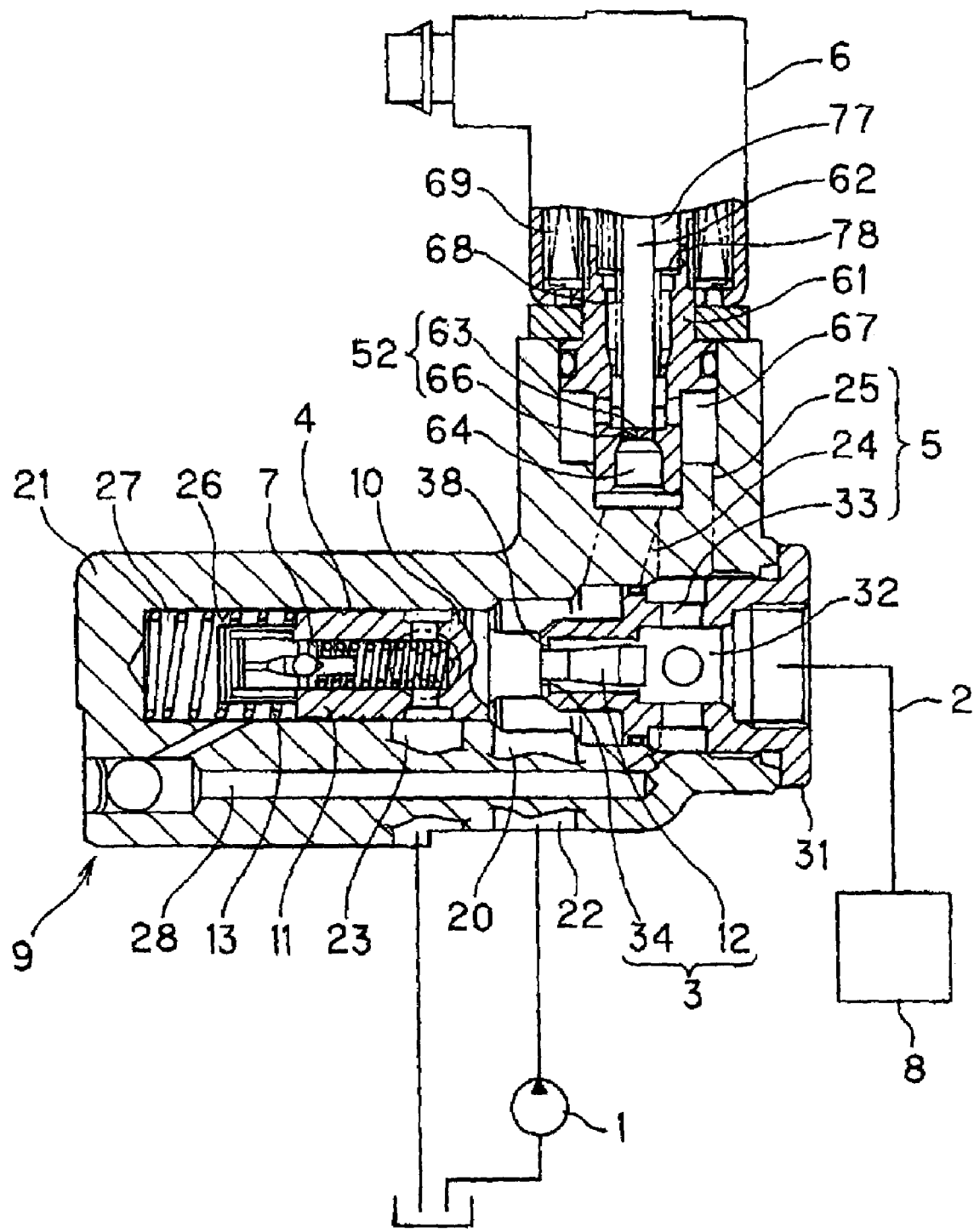
FIG. 2 is a cross-sectional view of a flow control device showing a second embodiment.

Next, a further embodiment as illustrated in FIG. 2 will be described. Members which are the same as those in the foregoing embodiments are labeled with the same reference numerals.

In this embodiment, a throttle passage 52 for passing hydraulic oil by circumventing the variable throttle section 3 is provided in a section of the solenoid valve 6.

The valve body 62 of the solenoid valve 6 has a circular conical front end section 63 which is inserted into a valve hole 66. As the valve body 62 is displaced in the upward direction in the diagram, the area of the opening formed between the front end section 63 and the valve hole 66 gradually becomes larger.

When the core 77 of the solenoid valve 6 becomes seated on a step section 78 of the housing 61, due to the impulsion of a spring 68, the valve body 62 becomes unable to move any further, and in this state, a structure is formed wherein the front end section 63 is detached slightly from the valve hole 66 and the bypass passage 5 is not fully closed. In other words, by this means, a throttle passage 52 is formed.

In this way, even if sticking of the spool 11 occurs as described above, it is still possible to supply hydraulic oil from the pump 1 to the power steering section 8, by circumventing the variable throttle section 3.

Figure 3:
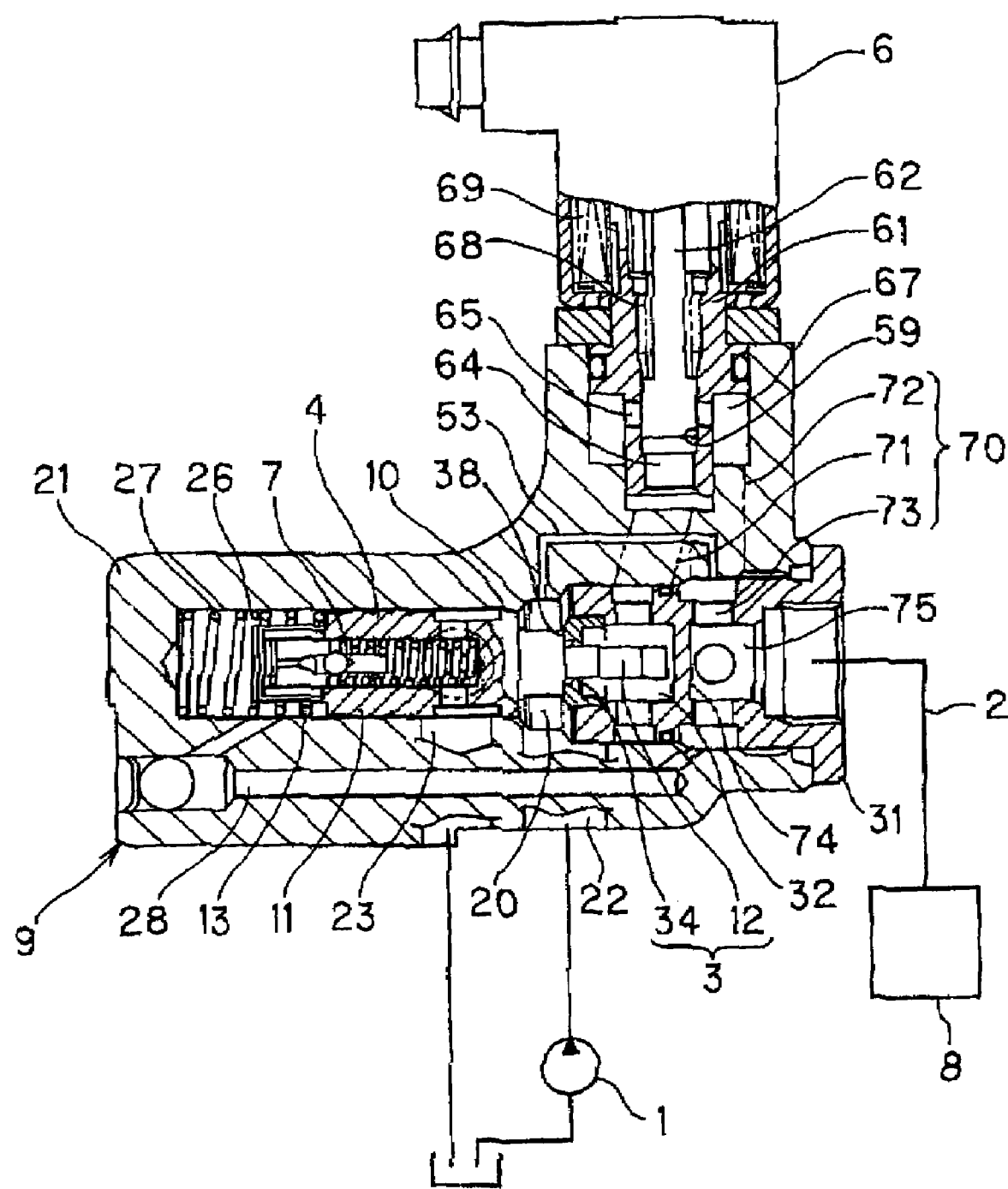
FIG. 3 is a cross-sectional view of a flow control device showing a third embodiment.

Next, yet a further embodiment as illustrated in FIG. 3 will be described. Members which are the same as the embodiment are labeled with the same reference numerals.

In this embodiment, a throttle passage 53 for circumventing the variable throttle section 3 is provided in the casing 21.

Furthermore, a bypass passage 70 connected to the supply passage 2 in series with the variable throttle section 3, and a solenoid valve 6 for opening and closing this bypass passage 70 are also provided. Bypass ports 71 and 72 constituting the bypass passage 70 are formed in the casing 21.

A supply port 34 for the variable throttle section 3, a downstream side chamber 32 as described above, an output chamber 75, and a bypass port 73 forming the bypass passage 70 are formed in the cap 31.

A partition 74 is formed in the cap 31, and the downstream side chamber 32, which is on the downstream side of the variable throttle section 3, is separated from the output chamber 75, which is on the downstream side of the solenoid valve 6, by means of this partition 74.

The output chamber 75 is connected to the spring chamber 26 of the flow control valve 4 by means of the connecting hole 28. Therefore, the flow control valve 4 is displaced in accordance with the pressure differential between the pressure on the upstream side of the variable throttle section 3 and the pressure on the downstream side of the solenoid valve 6, and the flow control valve 4 acts so as to maintain this pressure differential at a uniform level. Therefore, the flow of hydraulic oil supplied from the pump 1 to the power steering section 8 is controlled by the area of the opening in either the variable throttle section 3 or the solenoid valve 6, whichever has the smallest area of opening.

The throttle passage 53 is formed in the casing 21 in such a manner that it connects the upstream side chamber 20 with the output chamber 75.

Consequently, in this embodiment, as described above, even if the spool 11 or the solenoid valve becomes stuck and remains in a closed position, it is still possible to supply the hydraulic oil from the pump 1 to the power steering section 8, via the throttle passage 53.

This invention is not limited to the embodiments described above, and evidently may be modified in various ways within the scope of the technical idea of the invention.

The invention claimed is:

1. A power steering flow control device, comprising:
  a supply passage for supplying hydraulic oil discharged from a pump to a power steering section;
  a variable throttle section disposed in the supply passage;
  a return passage branching from the supply passage at a position upstream of the variable throttle section and connected to the inlet side of the pump;
  a flow control valve displaced in accordance with a pressure differential between upstream and downstream sides of the variable throttle section and connecting the return passage selectively to the supply passage;
  a spring for impelling the flow control valve in a direction to close the variable throttle section and the return passage;
  a throttle passage for connecting the upstream side and the downstream side of the supply passage by circumventing the variable throttle section;
  wherein the upstream side and the downstream side of the variable throttle section are maintained in a connected state by the throttle passage, when the flow control valve has closed both the variable throttle section and the return passage by being impelled by the spring upon shutdown of the pump;
  a bypass passage connected to the supply passage in parallel with the variable throttle section; and
  a solenoid valve for opening and closing the bypass passage.

2. The flow control device as defined in claim 1, wherein the solenoid valve comprises a valve hole through which hydraulic fluid passes, and a valve body for altering the effective surface area of the valve hole, the throttle passage being formed between the valve body and the valve hole.

* * * * *